United States Patent
Bjerkan et al.

(12)

(10) Patent No.: US 9,222,360 B2
(45) Date of Patent: Dec. 29, 2015

(54) COMBINED POWER AND HEATING STATION

(71) Applicant: Viking Heat Engines AS, Kristiansand (NO)

(72) Inventors: Trond Aas Bjerkan, Mandal (NO); Harald Nes Risla, Lillesand (NO); Kjetil Sorvig, Kristiansand (NO)

(73) Assignee: Viking Heat Engines AS, Kristiansand (NO)

( * ) Notice: Subject to any disclaimer, the term of this patent is extended or adjusted under 35 U.S.C. 154(b) by 0 days.

(21) Appl. No.: 14/389,227

(22) PCT Filed: Apr. 3, 2013

(86) PCT No.: PCT/NO2013/050063
§ 371 (c)(1),
(2) Date: Sep. 29, 2014

(87) PCT Pub. No.: WO2013/151443
PCT Pub. Date: Oct. 10, 2013

(65) Prior Publication Data
US 2015/0069756 A1    Mar. 12, 2015

(30) Foreign Application Priority Data

Apr. 4, 2012    (NO) .................................. 20120412

(51) Int. Cl.
*F24D 12/02*    (2006.01)
*F01B 23/10*    (2006.01)
(Continued)

(52) U.S. Cl.
CPC ................. *F01B 23/10* (2013.01); *F01K 13/00* (2013.01); *F01K 17/02* (2013.01); *F02G 1/00* (2013.01);
(Continued)

(58) Field of Classification Search
CPC .................................. F24D 12/02; F24D 10/00
USPC ............................................................ 290/2
See application file for complete search history.

(56) References Cited

U.S. PATENT DOCUMENTS 1,376,326 A * 4/1921 Evans ........................ 237/12.1
1,670,063 A * 5/1928 Darling ........................ 290/4 B
(Continued)

FOREIGN PATENT DOCUMENTS

EP    0952406    10/1999
GB    2387641    10/2003
(Continued)

OTHER PUBLICATIONS

International Search Report and Written Opinion for PCT/NO2013/050063 dated Aug. 2, 2013.
(Continued)

*Primary Examiner* — Joseph Waks
(74) *Attorney, Agent, or Firm* — Andrus Intellectual Property Law, LLP

(57) ABSTRACT

A combined heat and power plant has at least one primary heat source thermally connected to a heat distribution network for heat energy via one or more primary heat exchangers. At least one secondary heat source is thermally connected to one or more energy converters arranged to, when an amount of heat energy is supplied from the at least one secondary heat source, generate an amount of electrical energy for an internal electricity distribution network in the combined heat and power plant. A method is for operating a combined heat and power plant.

10 Claims, 2 Drawing Sheets

(51) Int. Cl.
*F01K 13/00* (2006.01)
*F02G 1/00* (2006.01)
*F01K 17/02* (2006.01)
*H02J 3/38* (2006.01)

(52) U.S. Cl.
CPC ............ *F24D 12/02* (2013.01); *F24D 2200/04* (2013.01); *F24D 2200/06* (2013.01); *F24D 2200/11* (2013.01); *F24D 2200/16* (2013.01); *F24D 2200/32* (2013.01); *F24H 2240/12* (2013.01); *H02J 3/381* (2013.01); *Y02B 10/40* (2013.01); *Y02B 10/70* (2013.01); *Y02B 30/14* (2013.01); *Y02E 20/14* (2013.01)

(56) References Cited

U.S. PATENT DOCUMENTS

| | | | | |
|---|---|---|---|---|
| 1,938,366 | A | * | 12/1933 | Armacost ........................ 60/662 |
| 3,937,023 | A | * | 2/1976 | Williamson ................... 60/670 |
| 4,127,107 | A | * | 11/1978 | Melgeorge .................. 122/14.2 |
| 4,438,340 | A | * | 3/1984 | Armiger ........................... 290/2 |
| 4,520,305 | A | * | 5/1985 | Cauchy ......................... 322/2 R |
| 4,873,840 | A | * | 10/1989 | Gilliusson .................... 62/238.6 |
| 5,994,638 | A | * | 11/1999 | Edelson ......................... 136/205 |
| 2005/0154499 | A1 | | 7/2005 | Aldridge et al. |
| 2005/0284946 | A1 | | 12/2005 | Komura et al. |
| 2009/0189456 | A1 | | 7/2009 | Skutt |
| 2009/0320503 | A1 | | 12/2009 | Kamiya |
| 2011/0025055 | A1 | | 2/2011 | Hasko et al. |
| 2012/0019098 | A1 | * | 1/2012 | Erbil et al. .................... 310/306 |

FOREIGN PATENT DOCUMENTS

| | | |
|---|---|---|
| WO | 2010119318 | 10/2010 |
| WO | 2011020463 | 2/2011 |

OTHER PUBLICATIONS

Response to Written Opinion for PCT/NO2013/050063 dated Jan. 30, 2014.
Written Opinion for PCT/NO2013/050063 dated Sep. 4, 2014.
International Preliminary Report on Patentablility for PCT/NO2013/050063 dated Jul. 31, 2014.

* cited by examiner

COMBINED POWER AND HEATING STATION

CROSS-REFERENCE TO RELATED APPLICATIONS

This application is the U.S. national stage application of International Application PCT/NO2013/050063, filed Apr. 3, 2013, which international application was published on Oct. 10, 2013, as International Publication WO2013/151443 in the English language. The international application is incorporated herein by reference, in entirety. The international application claims priority to Norwegian Patent Application No. 20120412, filed Apr. 4, 2012, which is incorporated herein by reference, in entirety.

FIELD

A combined heat and power plant (CHP plant) is described, in which a primary heat source is in thermal contact with a heat distribution network for heat energy via a primary heat exchanger. A method of operating a CHP plant is described as well.

BACKGROUND

Modern district heating stations use, to a great extent, biomass as the energy source, the biomass being burnt and the energy released being utilized to heat water to a suitable temperature. To avoid coming under regulatory requirements, for example, for steam boilers or the like, such district heating plants are, as a rule, operated at a temperature not higher than 120° C. and a working pressure of up to 2 bars. In spite of their, in part, large energy production, plants cannot be operated as independent units as they must have electrical energy from an external distribution network for the operation of pumps et cetera.

SUMMARY

The invention has for its object to remedy or reduce at least one of the drawbacks of the prior art or at least provide a useful alternative to the prior art.

The object is achieved through features, which are specified in the description below and in the claims that follow.

The invention provides a combined heat and power (CHP) plant which, in addition to producing heat at a relatively low temperature (up to 120° C.), is self-sufficient in electrical energy and can possibly also deliver a surplus of electrical energy to an external electricity distribution network. This is achieved by the CHP plant including a primary heat source, in which the combustion of a fuel, typically by biomass being burnt, provides for a primary heat-distribution fluid to achieve a prescribed temperature, typically up to 120° C., for circulation in a heat-distribution network, also called a district heat-distribution network, and in which, in addition to the primary heat source, a secondary heat source is arranged, in which the combustion of a fuel, typically the same type of fuel as in the primary heat source, provides for a secondary heat-distribution fluid to be heated to a temperature higher than that of the primary heat-distribution fluid, in order thereby to provide a more high-grade heat energy, which is used for the operation of an energy converter, typically a heat engine which drives an electric generator, or a thermoelectric generator which converts heat energy into electrical energy. The electrical energy is used for the operation of the primary heat source and possibly all or parts of the heat-distribution network. In addition, surplus energy may be transmitted to an external distribution network for electrical energy via an electrical interfacing device, which may also be used when the CHP plant has a deficiency of self-produced electrical energy, for example in a situation with a shutdown of the energy converter or the secondary heat source.

It may also be a purpose of the invention to utilize residual heat from the energy converter, this residual heat being transmitted, to the greatest extent possible, to the primary heat-distribution fluid that is used to transmit heat energy from the CHP plant to consumers connected to an associated heat-distribution network. This may be achieved by means of one or more heat exchangers that transmit(s) residual heat from the energy converter to the primary heat-distribution fluid by all or parts of the primary heat-distribution fluid circulating through a heat exchanger in the energy converter.

The proportion between the primary and the secondary heat sources may typically lie in the range between 2:1 and 20:1, wherein, typically, the aim is to provide approximately 5 kW of electrical energy from the energy converter.

The secondary heat source will typically deliver heat in the range of 150-300° C. distributed by means of heated thermo-oil, pressurized water or the like, which in turn is circulated to the energy converter. In periods of less need for heat energy, it is conceivable that only the secondary heat source is kept operative, as surplus heat (residual heat) from the energy converter provides a sufficient energy supply to the heat-distribution network.

In some cases, the electrical energy supplied from the energy converter may also be distributed on the external electricity distribution network, before it is then directed back to the internal electricity distribution network. This is generally done in cases in which a metering system records energy in versus energy out, and separate meters can thereby be used to monitor the energy flow into and out of the system. In several existing European small hydro-electric power stations, that is the way it works today. In other words, all the power produced is first fed out on the external network, as power consumed in the internal network is always taken from the external network. In that respect, the electrical interfacing device may be restricted to forming only an interface between the energy converter and the external electricity distribution network, as the internal electricity distribution network will then always be directly connected to the external electricity distribution network. There are also more ways of configuring the electricity distribution flow in and at a CHP plant, and the invention is not limited to one specific configuration.

The primary heat source may also include heat sources which are not based on combustion, for example various waste-heat sources or geothermal heat sources.

The heat-exchanger fluid circuit which is connected to the secondary heat source may also be provided with a bypass heat exchanger, which can transfer heat directly to the heat distribution network whenever needed, for example during a shutdown of the energy converter.

For heat conveyance in general, several types of thermofluids can be used, and the most obvious ones will be water, air or various industrial heat-transmission fluids such as various thermo-oils or silicone oils.

In a simple embodiment, the heat distribution network may consist of an air inlet, a fan, pipes and heat exchangers and also a hot-air outlet, wherein the hot air may be used for heating or, for example, drying of different materials, for example biomass. In such a case, the heat distribution network will be an open system, as the thermofluid, the air, that is, will be exchanged with the atmosphere all the time, as opposed to closed systems, such as most local/district heating plants which often use a closed circuit with water as the thermofluid.

In a first aspect, the invention relates more specifically to a combined heat and power plant for a district heating plant or a local heating plant in which at least a primary heat source in the form of a biomass fuel burning boiler is thermally connected to a heat distribution network for distribution of heat energy at a temperature not higher than 120° C. via one or more primary heat exchangers, characterized by at least one secondary heat source in the form of a biomass fuel burning boiler being thermally connected to one or more energy converters in the form of one or more heat engines arranged to generate, when an amount of heat energy at a temperature considerably higher than 120° C. is supplied from the at least one secondary heat source, an amount of electrical energy for an internal electricity distribution network in the CHP plant.

The internal electricity distribution network and an external electricity distribution network may be electrically interconnected via an electrical interfacing device arranged to transmit at least parts of the generated amount of electrical energy from said energy converter(s) to the external electricity distribution network.

The electrical interfacing device may be arranged for transmitting an amount of electrical energy at least corresponding to the amount of electrical energy generatable in said energy converter from the external electricity distribution network to the internal electricity distribution network.

The heat distribution network may include at least one tertiary heat exchanger, which is thermally connected to one or more of said energy converters and is arranged for the transmission of an amount of residual heat energy from said energy converter(s).

Said tertiary heat exchanger(s) may be arranged upstream of said primary heat exchanger(s).

An air pre-heater may be thermally connected to one or more of said energy converters and may be arranged to receive a portion of an amount of residual heat energy from said energy converter(s).

The ratio between the nominal thermal power capacity of the primary heat source and the nominal thermal power capacity of the secondary heat source may be in the range of 2:1-20:1.

In a second aspect, the invention relates more specifically to a method of operating a combined heat and power (CHP) plant for a district heating plant or a local heating plant, characterized by the method including the following steps:

a) providing an amount of heat energy from at least one primary heat source in the form of a biomass fuel burning boiler at a temperature not higher than 120° C. for one or more heat-energy consumers connected to a heat distribution network, a1) in order to, by thermal contact between the at least one primary heat source and the heat distribution network via one or more primary heat exchangers, transmit heat energy from said primary heat source(s) to a thermofluid in the distribution network;

a2) by thermal contact between the at least one secondary heat source in the form of a biomass fuel burning boiler and the heat distribution network, supplying an amount of heat energy via at least one tertiary heat exchanger in the form of residual heat energy from the conversion, by said energy converter(s), into electrical energy of the amount of heat energy supplied from said secondary heat source;

b) by means of one or more energy converters in the form of one or more heat engines, converting into electrical energy an amount of heat energy which is supplied to said energy converter(s) from at least one secondary heat source at a temperature considerably higher than 120° C.;

c) transmitting the electrical energy from said energy converter(s) to an internal electricity distribution network;

d) when there is a surplus of electrical energy, transmitting to an external electricity distribution network a portion of the generated electrical energy via an electrical interfacing device; and e) when there is a deficiency of electrical energy, transmitting electrical energy from the external electricity distribution network to the internal electricity distribution network via the electrical interfacing device.

The method may include the further step of:

f) supplying the amount of heat energy via said tertiary heat exchanger(s) upstream of said primary heat source(s).

The method may include the further step of:

g) supplying heat energy to an air supply for said primary heat source(s) means of an air pre-heater, the heat energy being, at least in part, residual heat energy from said energy converter(s).

BRIEF DESCRIPTION OF THE DRAWINGS

In what follows, an example of a preferred embodiment is described, which is visualized in accompanying drawings, in which.

DETAILED DESCRIPTION OF THE DRAWINGS

Figure 1:
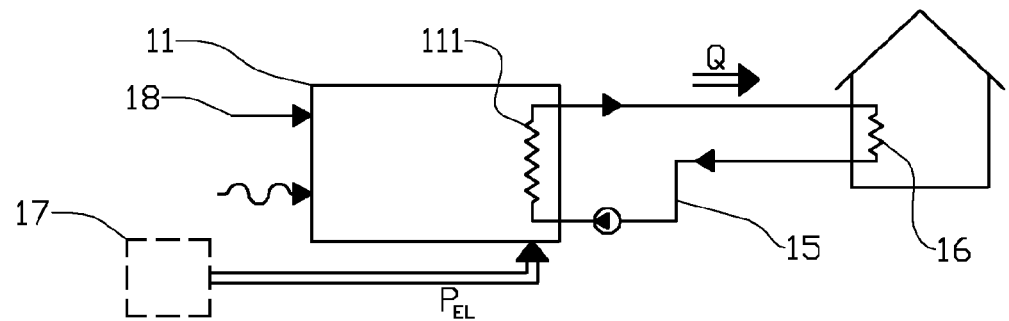
FIG. 1 shows a principle drawing of a district heating plant according to the prior art.
Figure 2:
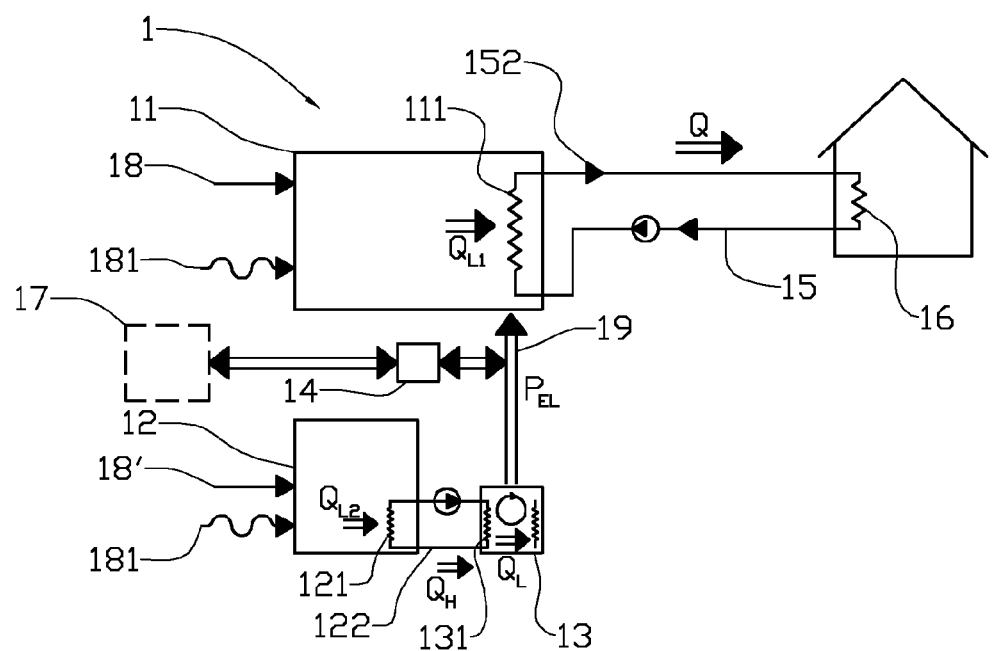
FIG. 2 shows a principle drawing of a first embodiment of a combined heat and power plant according to the invention.
Figure 3:
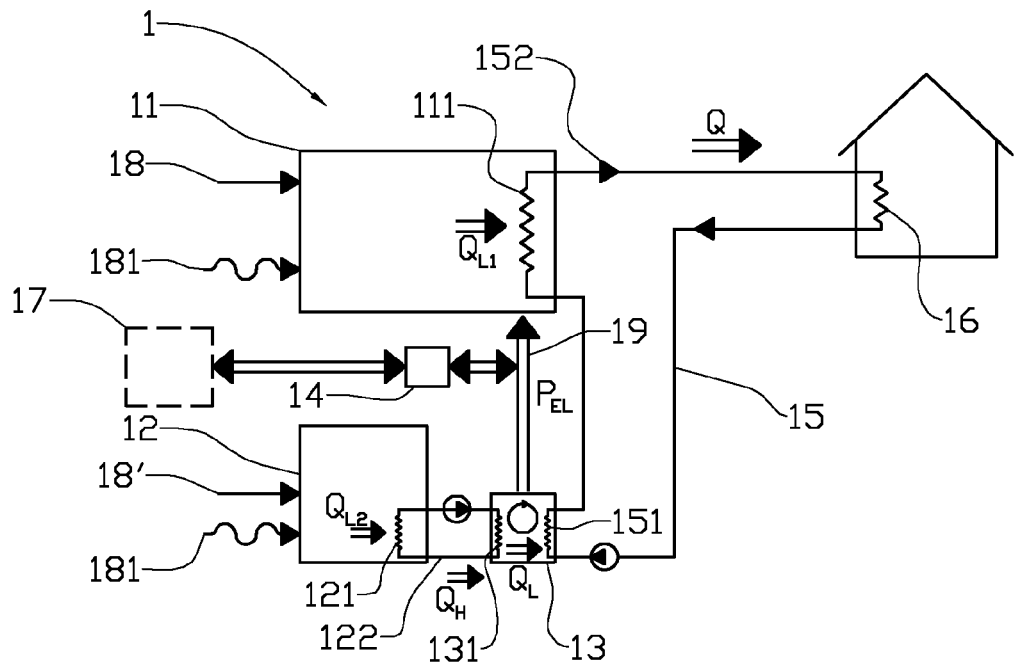
FIG. 3 shows a principle drawing of a second embodiment of a combined heat and power plant according to the invention.
Figure 4:
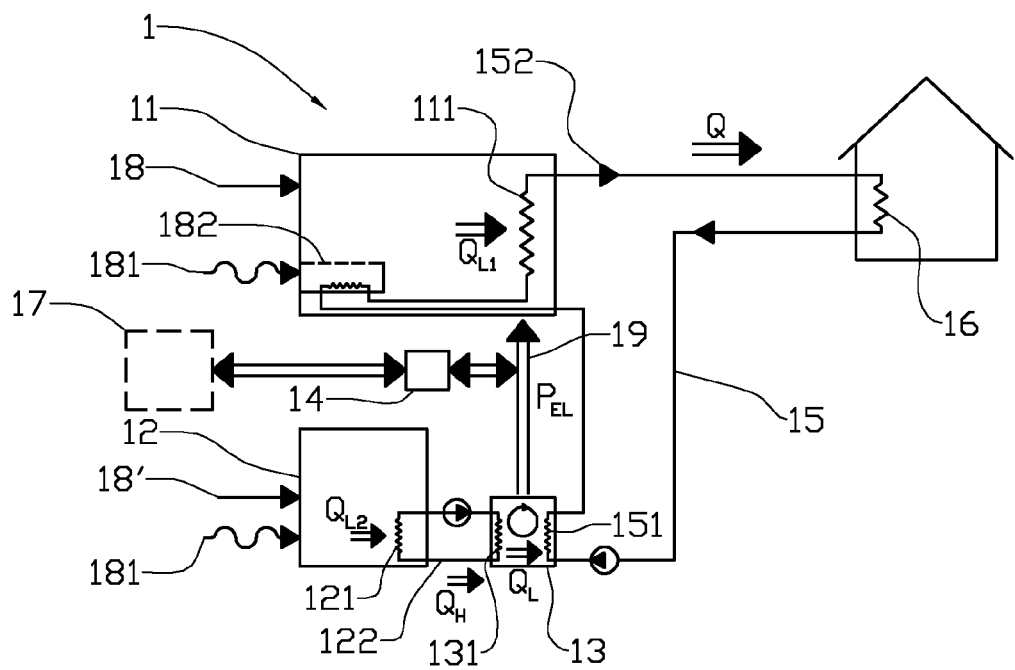
FIG. 4 shows a principle drawing of a third embodiment of a combined heat and power plant according to the invention.

Reference is made in particular to the FIGS. 2, 3 and 4 as regards the description of an exemplary embodiment of the present invention. The prior art, as it appears from FIG. 1, exhibits some principal features shared by the invention, and like elements are indicated by the same reference numerals.

The reference numeral 1 indicates a combined heat and power (CHP) plant according to the invention. A primary heat source 11 is connected to a heat distribution network 15 arranged to deliver heat energy Q at a heat consumer 16. The primary heat source 11 may be a boiler normally dimensioned per se, having a nominal output of 0.1-1 MW. The primary heat source 11 may be heated through the burning of a supply fuel 18 suitable therefor, for example biomass, under a supply of air 181, an amount of heat energy $Q_{L1}$ being made available to a primary heat exchanger 111 which forms part of the circulation circuit formed by the heat distribution network 15. Via the primary heat exchanger 111, the primary heat source 11 heats a first heat distribution fluid suitable therefor, for example water or a thermo-oil, which circulates in the heat distribution network 15 with an outlet temperature limited to approximately 120° C. at a pressure not exceeding approximately 2 bars.

A secondary heat source 12 may be a smaller boiler with a nominal output of approximately 50 kW. The secondary heat source 12 may be heated through the burning of a fuel 18' suitable therefor, for example the same type of fuel as that used by the primary heat source 11, under a supply of air 181, an amount of heat energy $Q_{L2}$ being made available to a first secondary heat exchanger 121. The secondary heat source 12 heats a second heat distribution fluid suitable therefor, for example water under overpressure or a thermo-oil, circulating in a heat-exchanger fluid circuit 122, to an outlet temperature considerably higher than 120° C., typically 150-300° C. An amount of heat energy $Q_M$ is transmitted to a second secondary heat exchanger 131 in an energy converter 13, typically formed as a heat engine or a thermoelectric generator, which, by means of the heat energy $Q_M$ supplied, generates electrical energy $P_{EL}$, typically at a nominal power output of approximately 5 kW. The electrical energy $P_{EL}$ which is delivered to an internal electricity distribution network 19, is used for the operation of electrical components (not shown) connected to the primary heat source 11 and possible other electric consumers in the CHP plant 1.

An electrical interfacing device 14, for example an inverter, is connected to the internal electricity distribution network 19 in the CHP plant 1 and an external electricity distribution network 17 in such a way that a surplus of electrical energy $P_{EL}$ from the energy converter 13 can be supplied to the electricity distribution network 17, and a deficiency in energy $P_{EL}$ from the energy converter 13 can be covered by a supply from the electricity distribution network 17, for example in a situation in which a shutdown of the secondary heat source 12 or the energy converter 13 will require a supply from external electrical-energy sources.

The heat distribution network 15 forms a closed circuit for the circulation of the first heat distribution fluid and the transmission of an amount of heat energy Q to one or more heat-energy consumers 16, shown schematically here as one heat-energy consumer 16. In the embodiment shown in the FIGS. 3 and 4, the heat distribution network 15 is additionally connected to a tertiary heat exchanger 151 arranged in the energy converter 13 and arranged to transmit residual heat energy $Q_L$ from the energy converter 13 and thereby preheat the return flow of the cooled, first heat distribution fluid circulating in the heat distribution network 15. The residual heat energy $Q_L$ is advantageously supplied upstream of the primary heat exchanger 111 to the primary heat source 11 to achieve a lowest possible heat-sink temperature for the energy converter 13 and thereby high efficiency.

It may be an advantage to preheat the air supply 181 to increase the efficiency of the primary heat source 11 in particular. For this purpose, an air pre-heater 182 may be used, which, in the embodiment shown according to FIG. 4, gets heat supplied from the heat distribution network 15 which, downstream of the tertiary heat exchanger 151, is laid in a loop passing through the air pre-heater 182. In an embodiment not shown, the air pre-heater 182 may be connected to a separate heat distribution circuit (not shown) which is in thermal contact with the energy converter 13, for example via the tertiary heat exchanger 151 or a further heat exchanger (not shown) arranged in connection with the energy converter 13 for the transmission of a portion of the residual heat energy $Q_L$.

When there is little need for heat energy, for example in summer, the supply of residual heat energy $Q_L$ by the energy converter 13, according to the embodiments shown in the FIGS. 3 and 4, may be sufficient to cover the demand for heat energy Q. In such a situation, the operation of the primary heat source 11 may be stopped. When the operation of the primary heat source 11 is stopped, the need for electrical energy $P_{EL}$ will decrease, and the residual heat energy $Q_L$ available may be increased.

The proportion between the primary and secondary heat sources 11, 12 is typically 2:1-20:1, that is to say the primary heat source 11 may be provided with a burner of an ordinary size for this type of plant, that is to say typically between 100 and 1000 kW, whereas the secondary heat source is provided with a relatively small burner, typically of approximately 50 kW.

The CHP plant 1 according to the invention may be used for a great number of purposes in which heat energy generated by the combustion of a fuel is to be distributed. Typical areas of application are plants for burning waste, biomass, regular district heating plants, wood driers (chips, shavings and sawn-timber driers) and so on.

The invention claimed is:

1. A combined heat and power plant for a district heating plant or a local heating plant, in which at least one primary heat source in the form of a biomass fuel burning boiler is thermally connected to a heat distribution network for distribution of heat enemy at a temperature not higher than 120° C. via one or more primary heat exchangers the combined heat and power plant comprising at least one secondary heat source in the form of a biomass fuel burning boiler that is thermally connected to one or more energy converters in the form of one or more heat engines arranged to, when an amount of heat energy at a temperature considerably higher than 120° C. is supplied from the at least one secondary heat source, generate an amount of electrical energy for an internal electricity distribution network in the combined heat and power plant.

2. The combined heat and power plant according to claim 1, wherein the internal electricity distribution network and an external electricity distribution network are electrically interconnected via an electrical interfacing device arranged for the transmission of at least parts of the generated amount of electrical energy from said energy converter(s) to the external electricity distribution network.

3. The combined heat and power plant according to claim 2, wherein the electrical interfacing device is arranged for the transmission of an amount of electrical energy at least corresponding to the amount of electrical energy generatable in said energy converter(s) from the external electricity distribution network to the internal electricity distribution network.

4. The combined heat and power plant according to claim 1, wherein the heat distribution network includes at least one tertiary heat exchanger which is thermally connected to (one of) said energy converter(s) and is arranged for the transmission of an amount of residual heat energy from said energy converter(s).

5. The combined heat and power plant according to claim 4, wherein said tertiary heat exchanger(s) is/are arranged upstream of said primary heat exchanger(s).

6. The combined heat and power plant according to claim 1, wherein an air pre-heater is thermally connected to one or more of said energy converters and is arranged to receive a portion of an amount of residual heat energy from said energy converter(s).

7. The combined heat and power plant according to claim 1, wherein the ratio between the nominal thermal power capacity of the primary heat source and the nominal thermal power capacity of the secondary heat source is in the range of 2:1-20:1.

8. A method of operating a combined heat and power plant for a district heating plant or a local heating plant, comprising:
   a) providing an amount of heat energy from at least one primary heat source in the form of a biomass fuel burning boiler at a temperature not higher than 120° C. for one or more heat-energy consumers connected to a heat distribution network, a1) in order to, by thermal contact between the at least one primary heat source and the heat distribution network and via one or more primary heat exchangers, transmitting heat energy from said primary heat source(s) to a thermofluid in the distribution network;

a2) by thermal contact between the at least one secondary heat source in the form of a biomass fuel burning boiler and the heat distribution network, supplying an amount of heat energy via at least one tertiary heat exchanger in the form of residual heat energy from the conversion, by said energy converter(s), into electrical energy of the amount of heat energy supplied from said secondary heat source;

b) by one or more energy converters in the form of one or more heat engines, converting into electrical energy an amount of heat energy which is supplied to said energy converter(s) from at least one secondary heat source at a temperature considerably higher than 120° C.;

c) transmitting the electrical energy from said energy converter(s) to an internal electricity distribution network;

d) when there is a surplus of electrical energy, transmitting to an external electricity distribution network a portion of the generated electrical energy via an electrical interfacing device; and e) when there is a deficiency in electrical energy, transmitting electrical energy from the external electricity distribution network to the internal electricity distribution network via the electrical interfacing device.

9. The method in accordance with claim 8, wherein the method further comprises:

f) supplying the amount of heat energy via said tertiary heat exchanger(s) upstream of said primary heat source(s).

10. The method in accordance with claim 8, wherein the method further comprises:

g) supplying heat energy to an air supply for said primary heat source(s) by means of an air pre-heater, the heat energy being, at least in part, residual heat energy from said energy converter(s).

* * * * *